US010209077B2

(12) United States Patent
Choudhury et al.

(10) Patent No.: US 10,209,077 B2
(45) Date of Patent: *Feb. 19, 2019

(54) METHOD FOR ACCELEROMETER-ASSISTED NAVIGATION

(71) Applicant: Zendrive, Inc., San Francisco, CA (US)

(72) Inventors: Romit Roy Choudhury, San Francisco, CA (US); Jayanta Pal, San Francisco, CA (US); Pankaj Risbood, San Francisco, CA (US); Jonathan Matus, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,558

(22) Filed: Jul. 18, 2017

(65) Prior Publication Data

US 2017/0314929 A1    Nov. 2, 2017

Related U.S. Application Data

(63) Continuation of application No. 15/243,513, filed on Aug. 22, 2016, now Pat. No. 9,733,089.

(60) Provisional application No. 62/207,461, filed on Aug. 20, 2015.

(51) Int. Cl.
*G01C 21/16* (2006.01)
*G01C 21/30* (2006.01)

(52) U.S. Cl.
CPC ........... *G01C 21/165* (2013.01); *G01C 21/30* (2013.01)

(58) Field of Classification Search
CPC .............................. G01C 21/165; G01C 21/30
USPC ......................................................... 701/447
See application file for complete search history.

(56) References Cited

U.S. PATENT DOCUMENTS

| 5,673,039 | A  | 9/1997  | Pietzsch et al. |
| 6,055,477 | A  | 4/2000  | McBurney et al. |
| 6,826,477 | B2 | 11/2004 | Ladetto et al. |
| 6,941,222 | B2 | 9/2005  | Yano et al. |

(Continued)

OTHER PUBLICATIONS

Das Tathagata; et al."PRISM: Platform for Remote Sensing using Smartphones," In. Proc. Mobisys '10, Jun. 15-18, 2010, San Francisco, USA, pp. 63-76.

(Continued)

*Primary Examiner* — Aaron L Troost
*Assistant Examiner* — Paula L Schneider
(74) *Attorney, Agent, or Firm* — Jeffrey Schox

(57) ABSTRACT

A method for primarily sensor-based navigation includes: in a first time period, collecting geophysical position data using a GPS receiver of a navigation device; in the first time period, collecting a first set of accelerometer data using an accelerometer of the navigation device; analyzing the first set of accelerometer data to produce a first set of vertical vehicular motion data; generating a mapping association between the first set of vertical vehicular motion data and the geophysical position data; in a second time period after the first time period, collecting a second set of accelerometer data using the accelerometer; analyzing the second set of accelerometer data to produce a second set of vertical vehicular motion data; and calculating an estimated location of the vehicle by analyzing the second set of vertical vehicular motion data in light of the mapping association.

22 Claims, 7 Drawing Sheets

(56) References Cited

U.S. PATENT DOCUMENTS

| | | |
|---|---|---|
| 7,065,449 B2 | 6/2006 | Brewster et al. |
| 7,532,196 B2 | 5/2009 | Hinckley |
| 7,668,931 B2 | 2/2010 | Parupudi et al. |
| 8,054,168 B2 | 11/2011 | McCormick et al. |
| 8,326,257 B2 | 12/2012 | Shiu et al. |
| 8,352,189 B2 | 1/2013 | Scott et al. |
| 8,369,876 B2 | 2/2013 | Bachmann et al. |
| 8,395,542 B2 | 3/2013 | Scherzinger et al. |
| 8,498,610 B2 | 7/2013 | Staehlin |
| 8,521,193 B2 | 8/2013 | Paek et al. |
| 8,577,703 B2 | 11/2013 | McClellan et al. |
| 8,634,822 B2 | 1/2014 | Silver et al. |
| 8,754,766 B2 | 6/2014 | Oesterling et al. |
| 8,971,927 B2 | 3/2015 | Zhou et al. |
| 8,972,103 B2 | 3/2015 | Elwart et al. |
| 9,064,412 B2 | 6/2015 | Baur |
| 9,121,940 B2 | 9/2015 | Psiaki et al. |
| 9,141,974 B2 | 9/2015 | Jones et al. |
| 9,185,526 B2 | 11/2015 | Guba et al. |
| 9,188,451 B2 | 11/2015 | Magnusson et al. |
| 9,221,428 B2 | 12/2015 | Kote et al. |
| 9,222,798 B2 | 12/2015 | Curtis et al. |
| 9,250,090 B2 | 2/2016 | Hille et al. |
| 9,311,271 B2 | 4/2016 | Wright |
| 9,360,323 B2 | 6/2016 | Grokop |
| 9,390,625 B2 | 7/2016 | Green et al. |
| 9,423,318 B2 | 8/2016 | Liu et al. |
| 9,558,520 B2 | 1/2017 | Peak et al. |
| 9,633,487 B2 | 4/2017 | Wright |
| 9,645,970 B2 | 5/2017 | Boesch et al. |
| 9,674,370 B2 | 6/2017 | Kim et al. |
| 9,689,698 B2 | 6/2017 | Wesselius et al. |
| 9,716,978 B2 | 7/2017 | Sankaran |
| 9,773,281 B1 | 9/2017 | Hanson |
| 9,794,729 B2 | 10/2017 | Meyers et al. |
| 9,800,716 B2 | 10/2017 | Abramson et al. |
| 9,801,027 B2 | 10/2017 | Levy et al. |
| 2002/0161517 A1* | 10/2002 | Yano ............... G01C 21/3407 701/420 |
| 2003/0018430 A1* | 1/2003 | Ladetto ............... G01C 21/16 701/472 |
| 2006/0153198 A1 | 7/2006 | Chadha |
| 2007/0208501 A1 | 9/2007 | Downs et al. |
| 2010/0198517 A1* | 8/2010 | Scott ............... G01C 21/165 702/5 |
| 2010/0299021 A1 | 11/2010 | Jalili |
| 2011/0077028 A1 | 3/2011 | Wilkes, III et al. |
| 2012/0050095 A1* | 3/2012 | Scherzinger ........... G01S 19/22 342/357.3 |
| 2012/0197587 A1 | 8/2012 | Luk et al. |
| 2013/0041521 A1 | 2/2013 | Basir et al. |
| 2013/0069802 A1 | 3/2013 | Foghel et al. |
| 2013/0211618 A1 | 8/2013 | Iachini |
| 2014/0358394 A1 | 12/2014 | Picciotti |
| 2015/0025917 A1 | 1/2015 | Stempora |
| 2015/0084757 A1 | 3/2015 | Annibale et al. |
| 2015/0233718 A1* | 8/2015 | Grokop ............... G01C 21/165 701/501 |
| 2016/0042767 A1 | 2/2016 | Araya et al. |
| 2016/0048399 A1 | 2/2016 | Shaw |
| 2016/0325756 A1 | 11/2016 | Cordova et al. |
| 2016/0328893 A1 | 11/2016 | Cordova et al. |
| 2017/0103342 A1 | 4/2017 | Rajani et al. |
| 2017/0103588 A1 | 4/2017 | Rajani et al. |
| 2017/0115125 A1 | 4/2017 | Outwater et al. |
| 2017/0138737 A1 | 5/2017 | Cordova et al. |
| 2017/0164158 A1 | 6/2017 | Watkins et al. |
| 2017/0178416 A1 | 6/2017 | Barreira Avegliano et al. |
| 2017/0178422 A1 | 6/2017 | Wright |
| 2017/0178424 A1 | 6/2017 | Wright |
| 2017/0210323 A1 | 7/2017 | Cordova et al. |
| 2017/0211939 A1 | 7/2017 | Cordova et al. |
| 2017/0279947 A1 | 9/2017 | Rajakarunanayake et al. |

OTHER PUBLICATIONS

Mohan Prashanth; et al. Nericell: Rich Monitoring of Road and Traffic Conditions using Mobile Smartphones, SenSys '08, Nov. 5-7, 2008, Raleigh, North Carolina.

* cited by examiner

METHOD FOR ACCELEROMETER-ASSISTED NAVIGATION

CROSS-REFERENCE TO RELATED APPLICATIONS

This application is a continuation of U.S. patent application Ser. No. 15/243,513, filed 22 Aug. 2016, which claims the benefit of U.S. Provisional Application Ser. No. 62/207,461, filed on 20 Aug. 2015, which are both incorporated in their entirety by this reference.

TECHNICAL FIELD

This invention relates generally to the vehicle telematics field, and more specifically to a new and useful method for determining accelerometer-assisted navigation in the vehicle telematics field.

BACKGROUND

GPS receivers are now commonly used in vehicles to provide location data-which can be used for vehicle tracking, routing, and a number of other important tasks. In particular, many drivers of personal vehicles take advantage of the GPS receivers commonly found in smartphones to provide location data.

Unfortunately, those GPS receivers are power-hungry, and can rapidly drain precious smartphone battery reserves. To add to this issue, GPS also requires a relatively unoccluded line of sight between the receiver and GPS satellites, which may be problematic in cities and other areas. Given these issues, GPS alone may not provide a satisfactory navigation solution in many scenarios. Thus, there is a need in the vehicle telematic field to create a new and useful method for accelerometer-assisted navigation. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
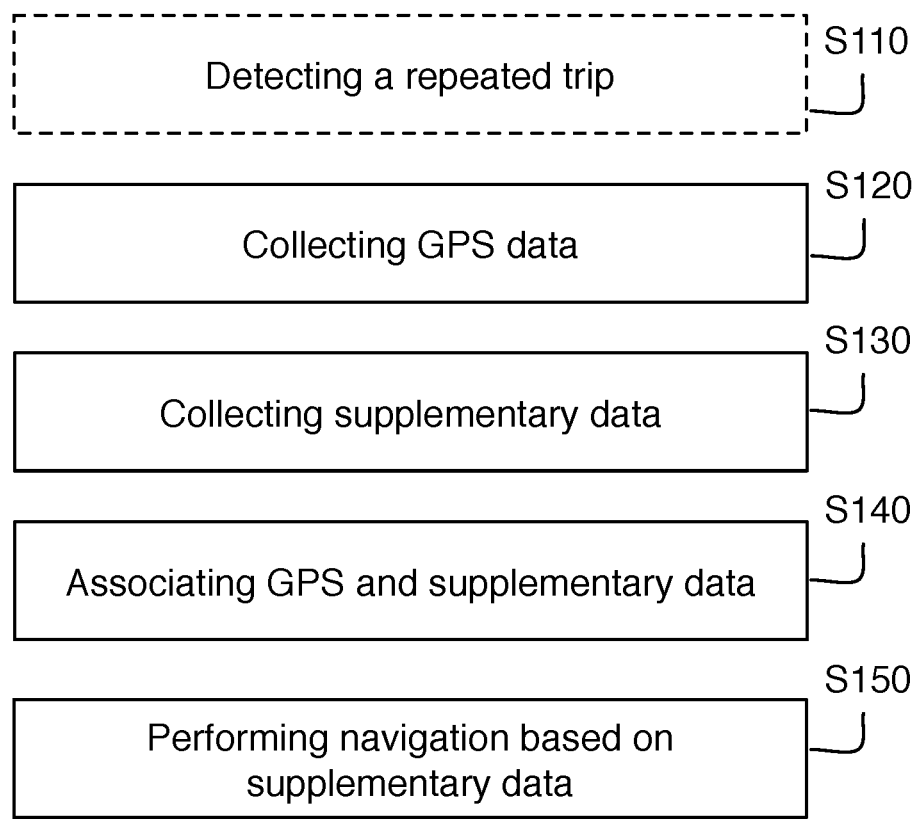
FIG. 1 is a flowchart representation of a method of a preferred embodiment.

As shown in FIG. 1, a method 100 for accelerometer-assisted navigation includes collecting GPS data S120, collecting supplementary data S130, associating the GPS data and the supplementary data S140, and performing navigation based on the supplementary data S150. The method 100 may additionally or alternatively include detecting a repeated trip S110.

The method 100 functions to enable navigation using supplementary data (e.g., accelerometer data, barometer data, gyroscope data, compass data, crowdsourced navigation data) as a way to reduce the use of GPS radios, thus saving power and/or allowing navigation in areas not conducive to GPS-based navigation.

Figure 2:
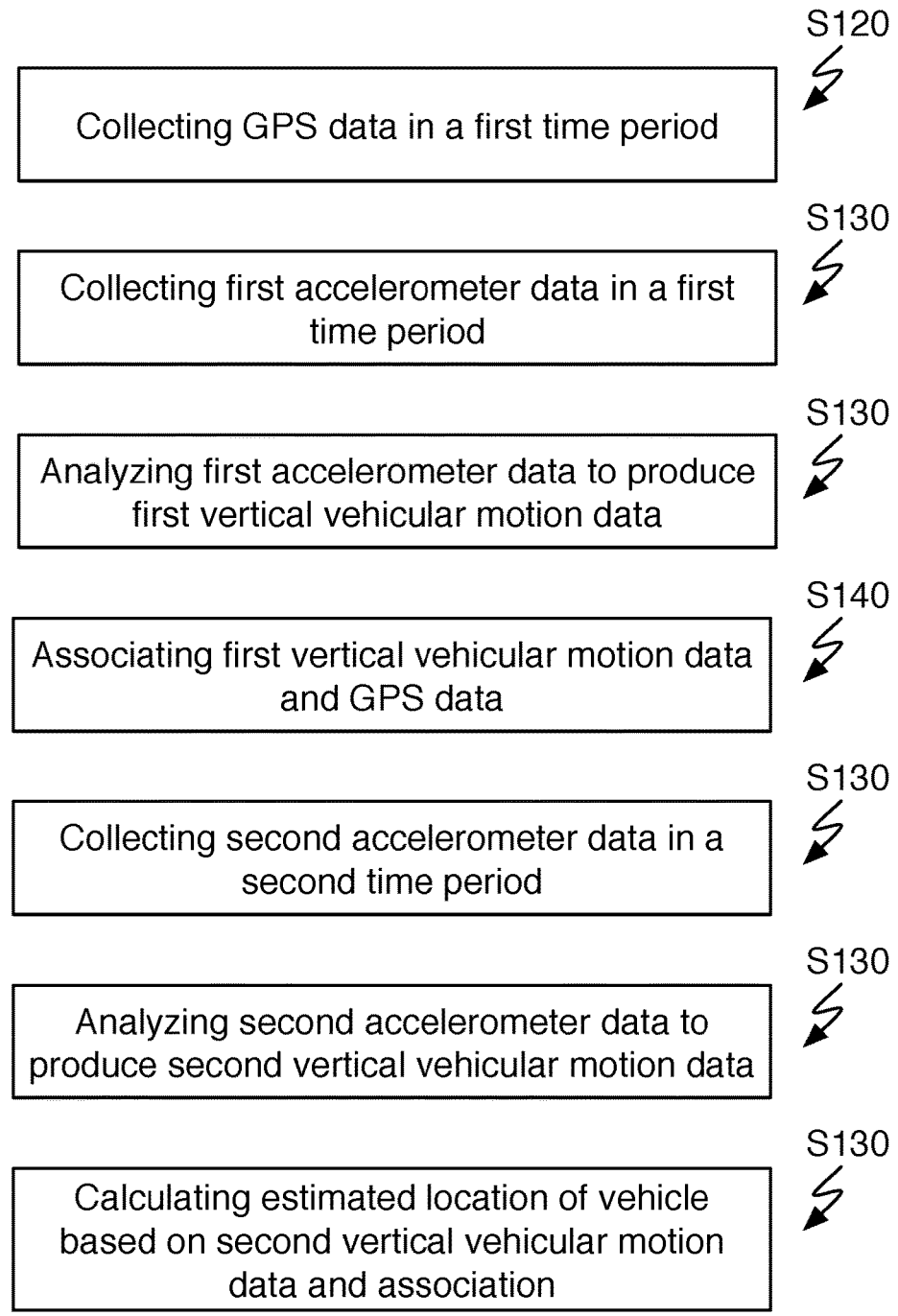
FIG. 2 is a flowchart representation of a first implementation of a method of a preferred embodiment.

As shown in FIG. 2, the method 100 is preferably used to enable primarily accelerometer-based navigation of a commonly traveled route (detected by S110); while driving the route, both GPS data and accelerometer data are taken so that accelerometer data may be associated with the route (S120 and S130). After enough accelerometer data has been collected, the accelerometer data is associated with position data taken by the GPS receiver (S140), thus creating an association between position along the route (and/or motion along the route) and accelerometer data. Once a satisfactory association has been created, the accelerometer data may be used (either alone or in combination with GPS) to perform navigation (S150).

Figure 3:
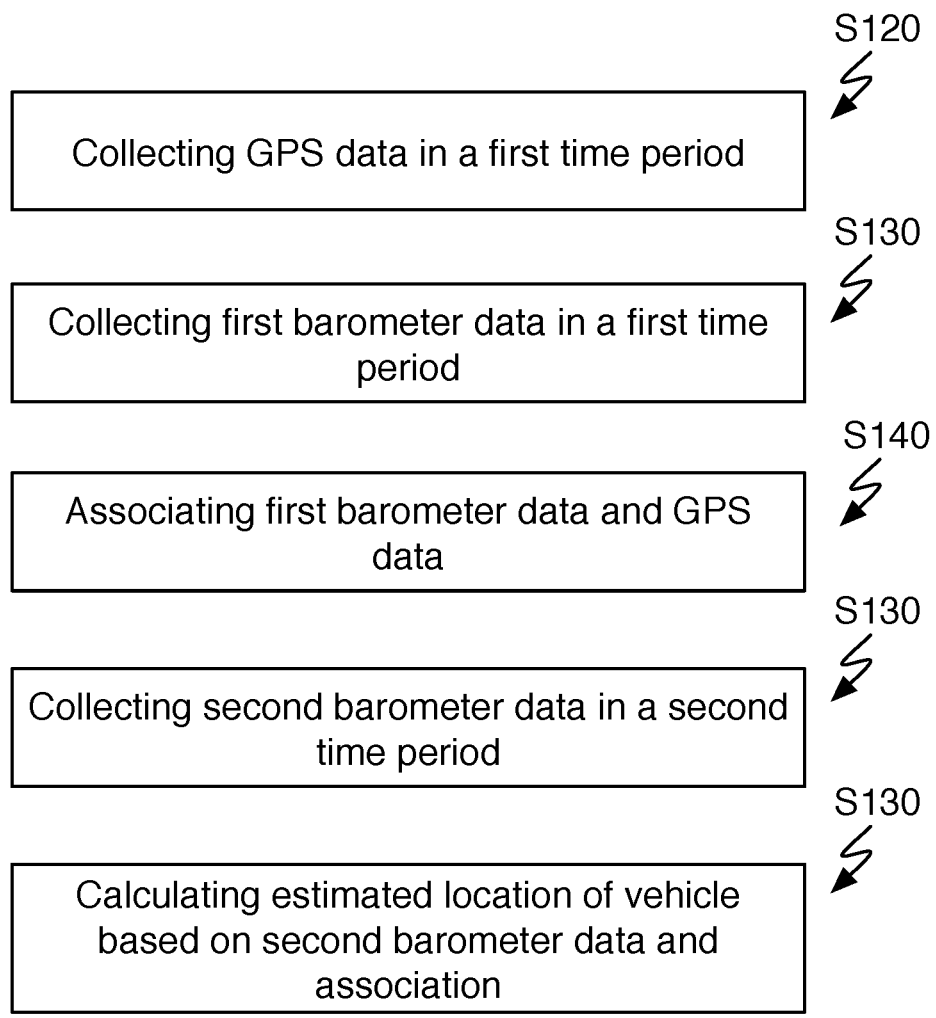
FIG. 3 is a flowchart representation of a second implementation of a method of a preferred embodiment.

As shown in FIG. 3, the method 100 may also be used to enable primarily barometer-based navigation of a commonly traveled route (detected by S110); similarly to the accelerometer-drive approach, while driving the route, both GPS data and barometer data are taken so that barometer data may be associated with the route (S120 and S130). After enough barometer data has been collected, the barometer data is associated with position data taken by the GPS receiver (S140), thus creating an association between position along the route (and/or motion along the route) and barometer data. Once a satisfactory association has been created, the barometer data may be used (either alone or in combination with GPS) to perform navigation (S150). Barometer data may be particularly interesting as a supplementary data source thanks to relative insensitivity to user movement of the navigation device.

Additionally or alternatively, the method 100 may be used to enable a number of supplementary-data-assisted navigation techniques. For example, the method 100 may be used to reduce the amount of time a GPS radio is active (e.g., measuring GPS data at certain intervals and performing dead reckoning between those intervals using accelerometer data) without explicitly associating position with accelerometer data (in this case, accelerometer data may be linked to a change in position, but not necessarily an absolute position). As another example, the method 100 may use the presence (or lack of presence) of radio transmitters (e.g., cellular, Wi-Fi, etc.) and characteristics of their transmissions to aid in navigation.

While supplementary data preferably includes accelerometer data, supplementary data may include any data suitable for performing navigation; for example, visual data (e.g., images from a camera), audio data (e.g., ambient road noise), and/or altitude data (e.g., as measured by a barometer). Supplementary data may additionally or alternatively include location data received from other sources; for example, GPS data from a nearby GPS receiver (e.g., the GPS receiver of a smartphone in a nearby car) may be used as an approximate indicator of location.

The method 100 is preferably implemented on a smartphone having a GPS receiver and an accelerometer, but may additionally or alternatively be implemented on any electronic device including or in communication with a GPS (or other GNSS-based system) receiver (e.g., smart watches, tablets, head-mounted displays, smart glasses). Hereafter, the device implementing the method 100 shall be referred to as a navigation device.

S110 includes detecting a repeated trip. S110 functions to detect that a navigation device user is traveling along a frequently traveled route (or, alternatively, traveling between a source and a destination frequently chosen together).

S110 preferably aids in determining which routes are ideal for performing supplementary data and GPS data association. For example, for navigation using solely accelerometer data (after accelerometer data has been associated with position) to be robust, the method 100 may require accelerometer data taken across multiple trips (e.g., to average that data or otherwise generate a strong signal from that data). Resultantly, the method 100 in some implementations may not collect supplementary data and/or may not process supplementary data until after detection of a repeated trip (e.g., repeated route, repeated source/destination pair) via S110.

S110 may include storing the number of times a source address or location has been used, the number of times a destination address or location has been used, the number of times a particular source/destination pair is used, and/or any suitable navigation data.

S110 may include detecting a repeated trip by comparing source and/or destination to stored data. Additionally or alternatively, S110 may include detecting a trip in any manner; for example, S110 may include detecting a trip by comparing a traveled route to a portion of a route linked with a repeated trip. In this example, a user may begin driving from home to work; S110 detects that the user is traveling along a route the user typically takes for this trip.

Trip detection may occur with the aid of a user-submitted travel source and/or a user-submitted travel destination; alternatively, trip detection may occur without the aid of a user-submitted travel source and/or travel destination. If trip detection occurs without a user entering a specific travel source, S110 may include turning on a GPS receiver of the navigation device and detecting the travel source location via GPS; however, detecting or estimating a travel source may be accomplished in any suitable manner. If trip detection occurs without a user entering a specific destination, S110 may include prompting the user to select from frequent destinations. For example, if S110 detects a user driving from home to a destination roughly in the direction of both a 'work' waypoint and a 'daycare' waypoint, S110 may include prompting the user to select from these destinations. If trip detection occurs without a user entering a specific destination, S110 may also include predicting a potential destination based on any suitable navigation data. For example, if S110 detects a user driving in a location close to the user's home address and in the direction of the user's home, S110 may predict that the user is traveling home. In this example, S110 may leverage additional information in predicting a potential destination; for example, if S110 detects that the user is driving at a certain time (e.g., on a weekday in the evening), S110 may become more confident in a prediction that the user is returning home. If trip detection occurs without a user entering a specific destination and S110 includes predicting a potential destination, the predicting step may include performing a historical analysis of user navigation data. The historical analysis functions to aggregate and synthesize user navigation data of different types (e.g., number of times a source address or location has been used, the number of times a destination address or location has been used, the number of times a particular source/destination pair is used, the time of day, the instantaneous direction of user travel, etc.). Preferably, S110 may use the historical analysis to make an informed prediction of a user destination in the absence of explicit user-input, but S110 may additionally or alternatively use the historical analysis for any other suitable purpose. The historical analysis may further include using navigation data from other users; for example, even if the user does not have an extensive user navigation data set, S110 may be able to predict a user destination based on common destinations that other users travel towards (e.g., towards a civic center or stadium).

S110 may include performing trip detection using any suitable data. For example, S110 may include detecting that a user is going to daycare based on the sounds of children's laughter (as sensed by a smartphone microphone) or that a user is going to work based on the time of day (e.g., the time the user normally leaves the house for work). As another example, S110 may include performing repeated trip detection based on user calendar/appointment information; if a user has an electronic calendar linked to the navigation system, the navigation system may identify repeated trip destinations based on information contained therein (e.g., stored destination, company name, contact name, time and date, etc.). As another example, S110 may include performing trip detection based on recent internet searches; if a user has used the internet recently to look up an address or to search for the name of a restaurant, and if the navigation system is linked to the user and also connected to the internet, the navigation system may identify a trip destination based on such a recent search even without a user explicitly indicating a specific intended destination.

In one variation of a preferred embodiment, S110 includes taking user input to determine frequent trips. For example, a user may specify a frequent trip that they take (e.g., home to work) so that accelerometer data collection/processing begins immediately for the route (as opposed to identifying that route automatically as a repeated trip after observing the user taking that route frequently).

In another variation of a preferred embodiment, S110 includes generating a set of previously traveled routes and determining a particular previously traveled route from the set as the detected previously traveled route. Preferably, each previously traveled route is associated with geophysical positions mapped to supplementary data (e.g., accelerometer data, barometer data, audio data, etc.) to enable navigation based, at least in part, on such supplementary data. Generating the previously traveled routes may be determined from any suitable sensor data, GPS data, and/or user navigation data; these data may also be used to compute probability weights (i.e., prediction confidence estimates) associated with each previously traveled route which may assist in determining a particular previously traveled route as the detected previously traveled route. For example, if the set of previously traveled routes includes two routes which are similar but which diverge at a particular geophysical location, vehicular motion data at that particular geophysical location may help S110 to distinguish the two routes; S110 may use this data to update probability weights corresponding to both routes and detect the route with the higher probability. The probability weights may be statically determined (e.g., determined when the user first begins to travel), dynamically updated (e.g., continuously updated based on any suitable data), or otherwise determined. S110 may include any suitable method for generating the set of previously traveled routes and for selecting a particular one of the set as the detected previously traveled route.

In response to detecting a previously traveled route, S110 may further include navigating according to the previously traveled route, which functions to provide travel directions to the user. In response to detecting a previously traveled route with sufficient supplementary data, S110 may further include changing an operating state of the GPS receiver (e.g., changing a duty cycle of the GPS receiver, switching off the GPS receiver, etc.) and navigating based on the supplementary data without collecting additional GPS data. S110 may also include taking any other suitable action in response to detecting a previously traveled route.

S120 includes collecting GPS data. S120 functions to collect navigation data using a GPS receiver; this data may be used to learn new routes and/or as a primary source of position data for navigation purposes. Additionally or alternatively, S120 may include collecting any global navigation satellite system (GNSS) data (e.g., GLONASS, Galileo, BeiDou, etc.).

S120 preferably includes collecting GPS data according to a navigation system operating state. Operating states preferably dictate how GPS data is collected, including data collection frequency, GPS receiver power state, GPS receiver orientation, etc.

S120 preferably functions to collect GPS data when necessary for navigation and/or route learning purposes, while disabling the GPS receiver when GPS data collection is not necessary. For example, S120 may include turning off a GPS receiver if a route is well-known by a supplementary navigation source (e.g., it can be navigated solely by accelerometer data, barometer data, or any other suitable supplementary data). As another example, S120 may include collecting GPS data infrequently (e.g., once every ten seconds) for well-known routes. In contrast, S120 may include collecting GPS data frequently (e.g., a few times a second) for routes that are not known.

S120 may additionally or alternatively include modifying operating states (e.g., switching a GPS receiver off) if the receiver is not able to receive position information (or position information is below a quality threshold). For example, a user traveling through a dense city may not be able to receive a high-quality GPS position data. Such city locations (sometimes referred to as "urban canyons" or "street canyons") affect the quality of received GPS position data due to both shadowing and multipath interference. Shadowing refers to GPS errors incurred due to line-of-sight effects; in the context of a dense city, tall buildings may physically block the transmission of a GPS signal to a GPS receiver, effectively casting a GPS "shadow" over particular city locations. S120 may include detecting such shadowing effects (e.g., by observing changes in the total received GPS signal power) and then modifying an operating state of the GPS receiver (e.g., switching the GPS receiver off to save battery power, decreasing the duty cycle of the GPS receiver to preserve power until shadowing effects are diminished, etc.). Multipath interference refers to errors incurred to due wave interference; in the context of a dense city, buildings may reflect GPS signals on their way to the GPS receiver, resulting in multiple received signals at the GPS receiver that are recorded to have traveled different distances and farther than the direct line-of-sight distance between GPS satellites and the GPS receiver. Since the direct line-of-sight distance is used to locate the GPS receiver, errors in this quantity result in errors in the determination of the location of the GPS receiver. Although multipath interference can occur even outside of a dense city environment (e.g., GPS signals may reflect off of clouds in the atmosphere even away from an urban setting), multipath interference can be especially problematic in an urban environment, where shadowing affects the received power of signals transmitted along the direct line-of-sight to the GPS receiver and where the received power from spurious reflected signals can become erroneously amplified. S120 may include detecting such multipath interference. For example, S120 may detect multipath interference by measuring a time-correlation function of received signals at the GPS receiver; since directly transmitted GPS signals and intermediately reflected GPS signals originate from the same signal source, they are likely to have similar signal features that are separated in time at the GPS receiver due to the fact that intermediately reflected GPS signals travel a longer distance to the GPS receiver. An example circuit which can be included in the GPS receiver and can measure such a time-correlation function is a delay lock loop (DLL), which measures the power difference between a first ('early') received signal and a second ('late') received signal as a function of time spacing in order to determine an Early-Late time spacing which maps the early and late signals onto each other. The DLL circuit outputs a voltage signal called a discriminator curve; by finding a zero of the discriminator curve (i.e., the time spacing at which the difference between the early and late signal power is zero), the DLL circuit can determine that there is an Early-Late time spacing which causes the discriminator to vanish. If the DLL circuit can find such a zero in the discriminator curve, this may be an indication of significant time-correlation between early and late signals; S120 may then be able to use this information to infer the presence of multipath effects. Alternatively, S120 may include detecting multipath interference in any suitable manner. In response to detecting multipath interference, S120 may then modify an operating state of the GPS receiver (e.g., switching the GPS receiver off to save battery power, decreasing the duty cycle of the GPS receiver to preserve power until multipath effects are diminished, etc.).

S120 may additionally or alternatively include modifying operating states of the GPS receiver in response to determining GPS position information is below a quality threshold in any other suitable manner. For example, the signal quality of the received signals at the GPS receiver can also be affected by the GPS satellite geometry. If two satellites nearly coincide with each other in the field-of-view of the GPS receiver, the inferred GPS receiver position determined from triangulation may have magnified errors as compared with two satellites which are further separated in the field-of-view. This geometric effect may be quantified in terms of a geometric dilution of precision (GDOP), which is defined as the ratio of errors incurred from satellite geometry to other errors incurred from signal measurement. Lower GDOP values (i.e., strong geometry) correspond to higher confidence (i.e., smaller errors) in the GPS measurements, while higher GDOP values (i.e., weak geometry) correspond to lower confidence (i.e., larger errors) in the GPS measurements. GDOP values greater than 20 may be an indication of poor GPS confidence/large GPS errors, but alternative GDOP thresholds may be used. In response to determining a high GDOP value, S120 may then modify an operating state of the GPS receiver (e.g., switching the GPS receiver off to save battery power, decreasing the duty cycle of the GPS receiver to preserve power until strong satellite geometry is restored, reorienting the GPS receiver relative to the GPS satellites to try to improve the satellite geometry in the field-of-view, etc.).

Navigation system operating states (as they pertain to GPS data collection) may be set based on any input data. For example, S120 may include collecting GPS data differently depending on navigation system battery state (e.g., charge level, charging status), time of day, location, route knowledge (e.g., how much data has been collected about the current route and/or position), GPS signal quality, or any other data.

S130 includes collecting supplementary data. S130 functions to collect data supplementary to GPS/GNSS data that may be used to perform navigation. Supplementary data preferably includes any data useful for navigation but not collected by the GPS receiver of the navigation device. For example, supplementary data may include visual data (e.g., images from a camera), audio data (e.g., ambient road noise), motion data (e.g., as measured by an IMU), atmospheric pressure data (e.g., as measured by a barometer) and/or altitude data (e.g., inferred from barometric data). Supplementary data may additionally or alternatively include location data received from other sources; for example, GPS data from a nearby GPS receiver (e.g., the GPS receiver of a smartphone in a nearby car) may be used as an approximate indicator of location. As another example, cell tower triangulation data (i.e., position data derived from radio tower triangulation or trilateration) or WiFi triangulation data may be used as an approximate indicator of location.

S130 preferably functions to collect supplementary data when necessary for navigation and/or route learning purposes. As most supplementary data collection techniques draw substantially less power than GPS-based navigation, S130 may include performing supplementary data collection substantially more frequently than GPS data collection. Additionally or alternatively, S130 may include collecting and/or storing supplementary data at any frequency.

S130 may include processing supplementary data; for example, raw accelerometer data may be translated into measured accelerations. As another example, S130 may include performing feature recognition on audio and/or video data to identify motion changes. As a third example, S130 may include interpreting barometer data based on weather conditions (e.g., as received from an internet-accessible weather report). As a fourth example, S130 may include interpreting magnetometer data to detect changes in vehicle heading (e.g., turns taken by a vehicle).

In one variation of a preferred embodiment, S130 may include processing accelerometer data in order to isolate accelerometer data corresponding to vertical vehicular motion (e.g., vehicular motion perpendicular a road surface). Vertical vehicular motion data preferably includes time, vertical vehicular acceleration, and vertical vehicular velocity but may further include or exclude other data related to vertical vehicular motion. Isolating vertical vehicular motion may be useful as a characteristic signature of a geophysical location; for example, if a particular road surface includes a pothole of a particular depth, vertical vehicular motion data acquired as the vehicle traverses the pothole may be characteristic of the geophysical position of the pothole and may be used to estimate the location of the vehicle without the use of GPS. Other road surface characteristics useful for identifying location may include speed bumps, for instance. In order to discern robust characteristic profiles from the vertical vehicular motion data, S130 may include acquiring data from multiple trips at a given location in order to extract the characteristic profile features in the vertical vehicular motion data; alternatively, S130 may acquire data from a single trip at a given location to infer a characteristic vertical vehicular motion profile (e.g., the characteristic profile in the vertical vehicular motion data may be distinct enough from a single trip). S130 may further include post-processing the acquired data (e.g., data filtering, data smoothing, data averaging, etc.) in order to, for example, filter out noise and/or isolate intrinsic features of the characteristic profile.

In a specific example of post-processing vertical vehicular motion data in order to discern robust profiles that are characteristics of geophysical locations, S130 may further include calibrating the vertical vehicular motion data for the suspension of the vehicle (i.e., how road surface features register as a vertical vehicular motion response as recorded by the navigation device). In cases in which S130 cannot leverage any specific information about vehicle suspension, S130 may accomplish suspension calibration relative to a baseline suspension profile default; this profile may represent the average vertical vehicular response inferred from all vertical vehicular motion data accessible to the navigation device but may alternatively be established in any suitable manner. In an instance in which a reference position is known (e.g., via GPS location) and is associated with a specific vertical vehicular motion profile, S130 may include comparing the associated vertical vehicular motion profile to a measured vertical vehicular motion profile based on accelerometer data (i.e., without a suspension calibration) and determining a suspension calibration profile based on a suspension-related difference. In an instance in which the navigation device can leverage information about the vehicle suspension, S130 may use such information to retrieve a corresponding stored calibration profile and calibrate the vertical vehicular motion data according to the corresponding stored calibration profile. For example, vehicle suspension may be characteristic of a particular vehicle manufacturer (e.g., a vehicle manufactured by Ford may have a characteristic suspension response different from that of a vehicle manufactured by Chevrolet), of a particular vehicle type (e.g., an SUV may have a characteristic suspension response different from that of a sedan), of a particular vehicle (e.g., a particular vehicle may have a characteristic suspension response different from that of another vehicle, even if the other vehicle is manufactured by the same manufacturer and is of the same vehicle type), of a particular vehicle weight, or of any other suitable vehicular parameter. S130 may detect any suitable vehicular parameter in any suitable manner; for example, S130 may detect suitable vehicular parameters via direct user-input (e.g., through a user-interface associated with the navigation device), detection (e.g., the navigation device may be able to interface with an electronic control unit of the vehicle wirelessly, e.g., via radio or Bluetooth, to determine suitable vehicular parameters), inference (e.g., monitored vehicular performance during travel), or in any other suitable manner.

Figure 4A:
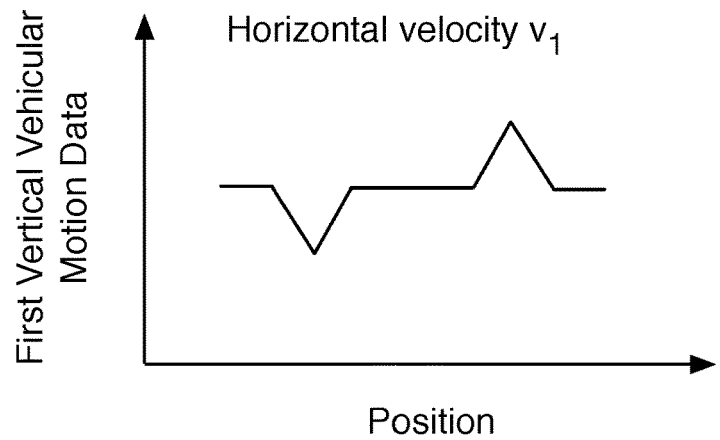
FIGS. 4A, 4B, and 4C are schematic graphical representations of the horizontal velocity dependence of vehicular motion data on position.
Figure 4B:
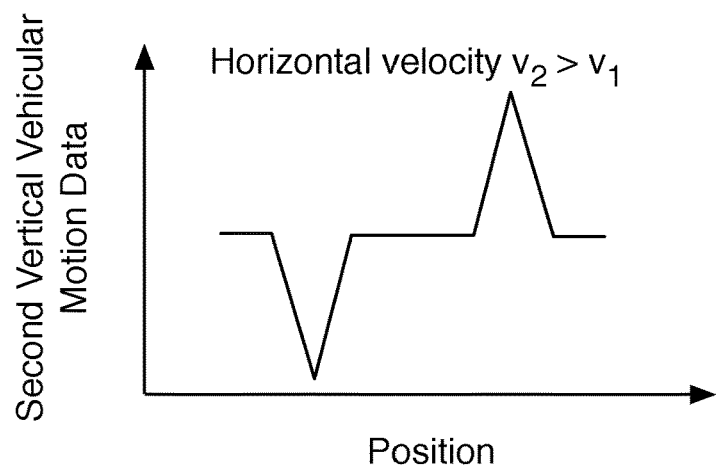
Figure 4C:
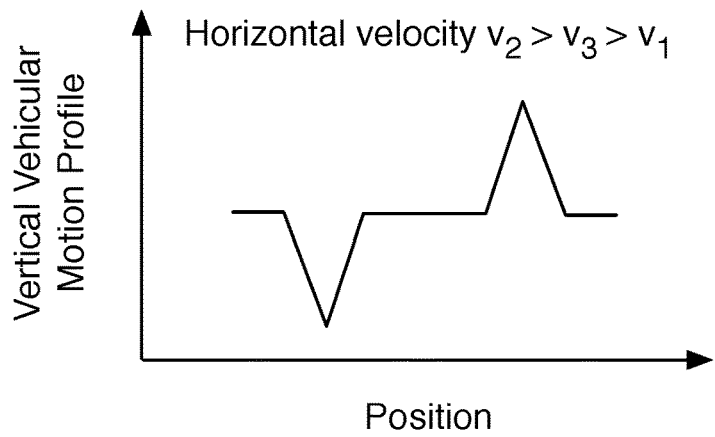

In another variation of a preferred embodiment, S130 may further include processing accelerometer data in order to isolate accelerometer data corresponding to horizontal vehicular motion (e.g., vehicular motion parallel a road surface). Horizontal vehicular motion data preferably includes time, horizontal vehicular acceleration, and horizontal vehicular velocity but may further include or exclude other data related to horizontal vehicular motion. As shown in FIGS. 4A, 4B, and 4C, such horizontal vehicular data may be useful since vertical vehicular motion data may need to be scaled based on horizontal vehicular speed in order to be correlated with characteristic vehicular motion profiles. As shown in FIG. 4A, a first set of vertical vehicular motion data may correspond to a vehicle traveling at a first horizontal velocity across a certain geophysical region; however, as shown in FIG. 4B, a second (potentially, but not necessarily, different) set of vertical vehicular motion data may correspond to the same vehicle traveling across the same geophysical region but at a faster horizontal speed. As shown in FIG. 4C, the vertical vehicular motion profile associated with that geophysical region may have been collected at a third, potentially intermediate, horizontal velocity. Although, as shown in FIGS. 4A, 4B, and 4C, the vertical vehicular motion response is schematically represented as increasing with increasing horizontal vehicular speed, the vertical vehicular motion response may decrease or be completely uncorrelated with horizontal vehicular speed. If the vertical vehicular motion data depends in any manner on the horizontal vehicular speed as a function of location, S130 may include scaling the vertical vehicular motion data in light of the horizontal vehicular motion data in any suitable manner.

Figure 5A:
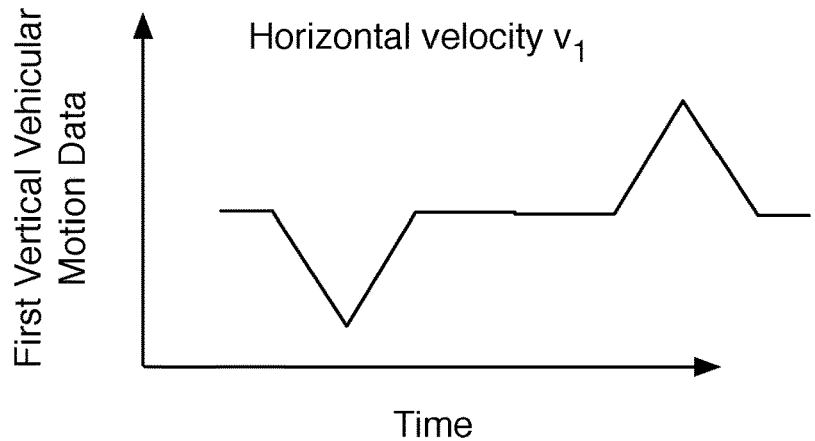
FIGS. 5A, 5B, and 5C are schematic graphical representations of the horizontal velocity dependence of vehicular motion data on time.
Figure 5B:
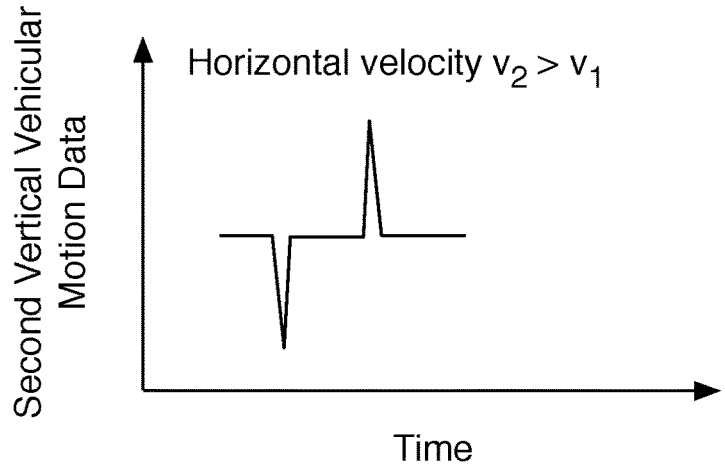
Figure 5C:
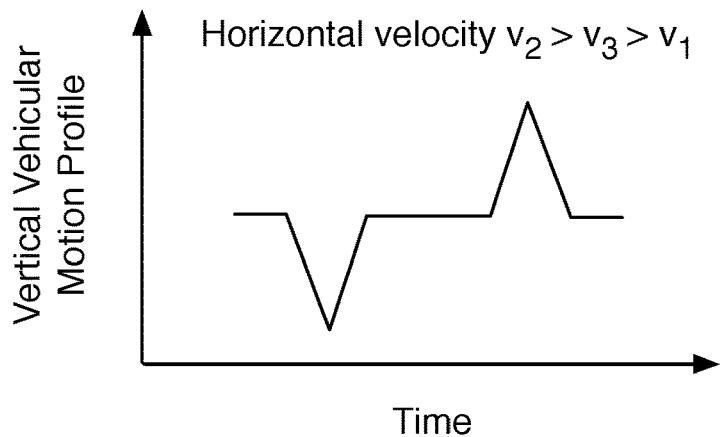

In another specific example and as shown in FIGS. 5A, 5B, and 5C, such horizontal vehicular data may additionally be useful since a characteristic vehicular motion profile may correspond to a narrower vertical motion response in time as the horizontal vehicular velocity increases. As shown in FIG. 5A, a first set of vertical vehicular motion data may correspond to a vehicle traveling across a geophysical region at a first horizontal velocity as a function of time; however, as shown in FIG. 5B, a second (potentially, but not necessarily, different) set of vertical vehicular motion data may correspond to the same vehicle traveling across the same geophysical region as a function of time but at a faster horizontal speed. As shown in FIG. 5C, the vertical vehicular motion profile associated with that geophysical region as a function of time may have been collected at a third, potentially intermediate, horizontal velocity. If the vertical vehicular motion data depends in any manner on the horizontal vehicular speed as a function of time, S130 may include time-scaling the characteristic vertical motion profiles in order to account for the dependence of the vertical vehicular motion profile on the horizontal vehicular motion; without time-scaling, for example, the ability of S130 to estimate a vehicle location from the vertical vehicular motion data may be affected.

In another specific example, S130 may include using horizontal vehicular motion data in order to infer a horizontal vehicular direction of travel. S130 may include incorporating the horizontal vehicular direction of travel in estimating a vehicular location based on the vertical vehicular motion data. For example, if S130 uses the vertical vehicular motion data to estimate a location of the vehicle and generates two likely locations of equal probability based on the vertical vehicular motion profile, S130 may include using the horizontal vehicular direction of travel to decide between them (e.g., if the vehicle is traveling towards one of the locations and away from the other location). Additionally or alternatively, S130 may include using horizontal vehicular motion data in any suitable manner.

In another variation of a preferred embodiment, S130 may include collecting and processing barometer data. Barometer data may be comparatively insensitive to local navigation device movement relative to accelerometer data (e.g., comparatively less affected by the user interacting with the navigation device); barometer data in combination with accelerometer data may then improve location estimates based primarily on either barometer or accelerometer data in isolation. However, S130 may include using primarily or solely a single source of supplementary data. Although barometric pressure readings associated with the location of the vehicle may be characteristic of that location (e.g., the location's altitude), the barometric pressure data may also be affected by extrinsic factors uncharacteristic of the particular location (e.g., weather); therefore, S130 may include processing barometer data in order to correct for these extrinsic factors. In a specific example where the extrinsic factor affecting barometric pressure is weather, S130 may include acquiring weather-associated pressure data (e.g., via the navigation device by retrieving the data from a local weather source over the internet) and correcting barometer data in light of the weather-associated pressure data. S130 may additionally include any suitable barometer processing step (e.g., time averaging, noise filtering, aggregating weather-associated pressure data from multiple sources, etc.). For example, S130 may include calculating change in barometric pressure or normalized barometric pressure (e.g., normalizing barometric pressure to an initial barometric pressure or looking at changes to remove error introduced by weather effects, for instance).

S130 may additionally or alternatively include modifying navigation system operating states as they pertain to supplementary data collection (e.g., choosing to store sensor data or not, frequency of supplementary data collection, processing parameters, etc.). Navigation system operating states (as they pertain to supplementary data collection) may be set based on any input data. For example, S130 may include collecting supplementary data differently depending on navigation system battery state (e.g., charge level, charging status), time of day, location, route knowledge (e.g., how much data has been collected about the current route and/or position), GPS signal quality, or any other data.

S140 includes associating the GPS data and the supplementary data. S140 functions to link supplementary data to position; in most cases, GPS data is the initial source of this position data. For example, S140 may include associating specific accelerometer or barometer responses with specific positions (as determined by GPS).

S140 may include associating GPS data and supplementary data in any manner; for example, GPS data may be used to correlate supplementary data to a position. In this example, a particular supplementary data profile (e.g., a specific turning pattern as measured by an accelerometer) may be correlated to a specific position or area (as measured by GPS) so that in the future, if this supplementary data profile is detected, the navigation system location may be derived without use of GPS.

One example of a preferred embodiment includes using GPS data to provide initial position measurements which S140 can then use in estimating vehicular position based on the supplementary data. For example, S140 may include calculating an estimated location of the vehicle based on vertical vehicular motion data and then compare this estimated location to the GPS initialized position. If the estimated location of the vehicle based on vertical vehicular motion includes one candidate location in San Francisco and another candidate location in Oakland, S140 may leverage GPS initialized data localizing the vehicle to San Francisco in the calculation of the estimated location of the vehicle (i.e., locality may be used in weighting or scoring candidate locations).

As another example, GPS data may be used to provide initial position measurements, from which motion measurements may be used to perform dead reckoning or a similar technique. Dead reckoning refers to a process for calculating a change in position based on motion data (e.g., without directly measuring position via GPS); by measuring vehicular velocity as a function of time (or inferring vehicular velocity from accelerometer measurements), a change in position can be calculated via time integration. Dead reckoning may be used for estimating the location of the vehicle on a road surface; in this case, dead reckoning may specifically leverage horizontal vehicular motion data to estimate a change in horizontal vehicular position relative to a road surface. If S140 includes dead reckoning to estimate a change in vehicular position, the result of dead reckoning may be used for a variety of purposes.

In a first specific example, S140 may include dead reckoning in order to produce a vehicular location estimate separate from the vehicular location estimate based on vertical vehicular motion data. In this specific example, S140 may include receiving an initial position from a GPS receiver, using dead reckoning to estimate a change in vehicular position that can be added to the initial position to produce a GPS-and-accelerometer-derived location estimate, and comparing the GPS-and-accelerometer-derived location estimate to the estimated vehicular location derived from vertical vehicular motion data in light of the mapping association. Particularly in cases in which S140 selects the estimated vehicular location derived from vertical vehicular motion data from a set of potential locations with comparable likelihoods, S140 may include the comparison of the GPS-and-accelerometer-derived location estimate to the estimated vehicular location derived from vertical vehicular motion data in calculating the estimated location of the vehicle (e.g., averaging the GPS-and-accelerometer-derived location estimate and the estimated vehicular location derived from vertical vehicular motion data, adjusting probability or confidence weights associated with each member of the set of potential vertical vehicular motion locations in light of the GPS-and-accelerometer-derived location estimate, averaging the estimates according to the confidence weights, etc.). S140 may also include choosing between the GPS-and-accelerometer-derived location estimate and the estimated vehicular location derived from vertical vehicular motion data based on a calculated confidence level in either estimate. For example, if the GPS-and-accelerometer-derived location estimate corresponds to a location in the middle of the ocean due to an initial position error arising from GPS poor GPS satellite geometry, S140 may include assigning a low confidence to the GPS-and-accelerometer-derived location estimate (e.g., where the confidence assignment is based on a calculation of the GDOP value associated with the received GPS signal) and choosing the estimated vehicular location derived from vertical vehicular motion data based on a higher associated confidence. In a separate context, instead of choosing between different location estimates, S140 may include weighting the different estimates according to an estimated confidence weight and taking the confidence-weighted average as the estimated vehicular location.

In a second specific example, S140 may include dead reckoning to calculate a location estimate error from the vertical vehicular motion data. If the vehicle starts at a known location (e.g., known via GPS), S140 may include dead reckoning to estimate a vehicular location by adding the known location to the vehicle position change calculated from dead reckoning to produce a GPS-and-accelerometer-derived location estimate; when the GPS-and-accelerometer-derived location estimate is similar to the location estimated from vertical vehicular motion data, S140 may be able to use this information to conclude that the location estimate error from vertical vehicular motion data is low (e.g., the error is below some threshold, the confidence in the prediction is higher than some threshold confidence, etc.) and take a corresponding action (e.g., modify an operating state of the GPS receiver, navigate primarily using supplementary data, etc.). S140 may also include calculating a location estimate error in any other suitable manner (e.g., by direct comparison of the location estimate from vertical vehicular data to a GPS-derived location estimate).

S140 may also include dead reckoning for any other suitable purpose.

GPS data is preferably associated with supplementary data on a time basis; that is, GPS data is associated with supplementary data taken within a certain time period (e.g., a few seconds) of the GPS data. Subsequent supplementary data taken at a future time (e.g., a month later) may then be compared to earlier supplementary data (e.g., analyzed for correlations); S140 preferably includes using that comparison and the GPS association with the earlier supplementary data to estimate location based on the supplementary data at the future time. The estimated location based on the comparison of earlier and subsequent supplementary data can be performed in any suitable manner. For example, calculating the estimated location of the vehicle may include generating a set of potential locations, each potential location associated with a supplementary data profile. In some specific examples, S140 may calculate the estimated location of the vehicle solely based on correlations between the set of supplementary data profiles from the potential locations and supplementary data taken at the time of travel (e.g., real-time vertical vehicular motion data, real-time barometer data, etc.); alternatively, S140 may also use additional information (etc., proximity to a GPS-measured initial vehicular location, combination with a GPS-and-accelerometer-derived location inferred from dead reckoning, etc.) in calculating the estimated location of the vehicle. S140 may also include calculating the estimated location of the vehicle based on the comparison in any suitable manner (e.g., averaging the different estimates, performing a weighted-average of the estimates based on a probability weight, performing a weighted-average of the estimates based on a confidence weight corresponding to any of the estimation methods, etc.). Additionally or alternatively, GPS data may be associated with supplementary data in any manner.

GPS data is preferably associated with processed supplementary data (described in more detail below), but may additionally or alternatively be associated with unprocessed supplementary data.

S140 preferably includes performing supplementary data processing and/or filtering. Supplementary data processing preferably attempts to identify patterns or events within supplementary data that correspond either to a particular position/area or to a motion associated with a particular position. As an example of position correspondence, the road surface of a particular stretch of road may have a characteristic profile identifiable by accelerometer readings (of navigation systems located in cars traveling that stretch of road). As an example of motion correspondence, a particular curve in a road may result in a predictable and distinct driver turning response (identifiable by accelerometer and/or gyroscope data).

Figure 6:
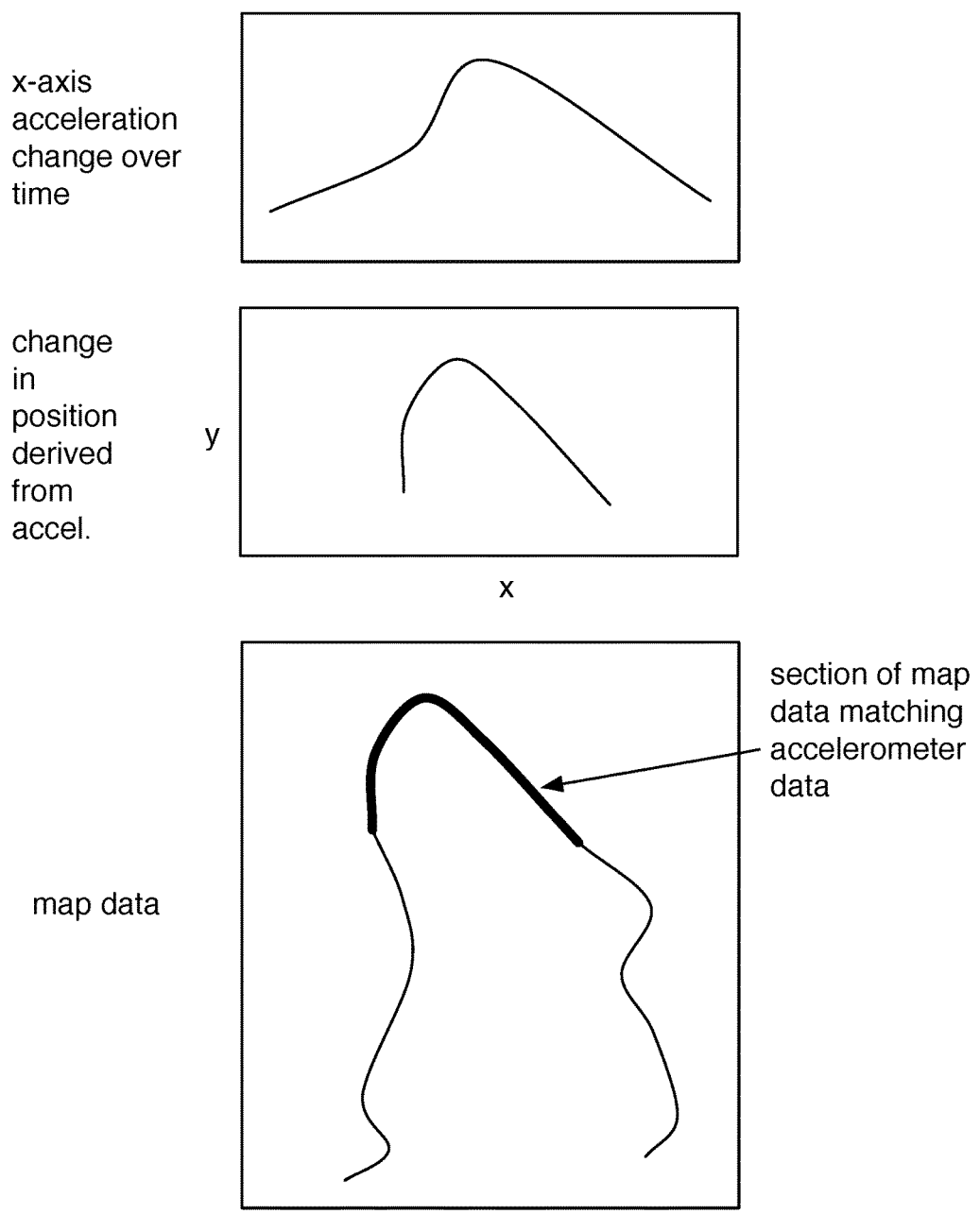
FIG. 6 is an example representation of matching supplementary data to map data.

These correspondences may be formed in a number of ways; for example, a correspondence may be formed when a supplementary data pattern is associated with a position repeatedly (e.g., the pattern may not be explicitly identified, but it occurs every time in a particular position as measured by GPS, observed over five separate times). As another example, a correspondence may be formed by feature recognition (e.g., the pattern looks like a right hand turn with a particular radius of curvature, which can be matched to a road present in navigation map data based on profile and GPS position), as shown in FIG. 6.

In cases where S140 includes performing feature recognition, S140 preferably first includes performing feature identification. For example, in the previous example, S140 may include first identifying that a particular accelerometer data pattern identifies a right hand turn, and after said identification, then comparing the right hand turn to navigation map road curvature data.

Feature identification may also be used to remove noise (and/or any other undesired signal components) from supplementary data. For example, S140 may include detecting that motion data recorded by a smartphone's accelerometer resulted from a user moving the phone within the car (rather than a motion of the car itself); signal associated with this motion may be removed from the supplementary data used for navigation purposes. As another example, S140 may include detecting a lane change during a turn, and transforming the motion data to better reflect the curvature of the turn (instead of the raw data, which includes motion due to both the turn and the lane change). In some cases, noise may not be easily removable (e.g., cases where noise overwhelms signal), and S140 may include discarding noisy supplementary data.

S140 may also include using feature identification to modify how supplementary data is stored and/or associated. For example, S140 may include correlating z-axis vehicle motion (which is measured by an accelerometer and/or a barometer, and corresponds to variance in height across the road surface) to position on a road. Road surface may be a function of not only position along a road (i.e., in the direction of travel), but also of position across a road (i.e., which lane the vehicle is in and potentially even position within the lane). Resultantly, data may need to be measured across all lanes (in a particular direction) to provide a good correlation between road surface and position along the road. In this example, S140 may include storing data separately for lanes; therefore, S140 may use feature identification of a lane change to modify for which lane data is stored.

Feature identification may be performed in any suitable manner. As a first example, feature identification may include comparing supplementary data to supplementary data of the same type (e.g., accelerometer data is compared to other accelerometer data) tagged as representative of a particular feature. As a second example, feature identification may include algorithmically processing supplementary data to evaluate it for certain characteristics. As a third example, feature identification may include performing a preliminary correspondence between supplementary data of one type and data of another type (e.g., other supplementary data, GPS data, etc.) and then identifying a feature in the supplementary data of the first type based on feature identification run on data of the second type. As a fourth example, feature identification may include receiving explicit feature identification from a user (e.g., a user presses a button identifying that the user just made a right hand turn).

S140 may include performing supplementary data processing by corroborating multiple sources. For example, S140 may include receiving vehicle speedometer data (e.g., via an OBD-II interface) in addition to accelerometer data from a smartphone accelerometer; if the smartphone accelerometer records a large change in acceleration not noted by the speedometer, that may indicate that the smartphone is in motion relative to the vehicle (and this accelerometer data may be processed/filtered accordingly).

As another example, S140 may include adjusting supplementary data based on vehicle speed (which in some cases may be obtained via the GPS receiver of the navigation system). Time-scaling of vertical vehicular motion data is one example, but S140 may additionally or alternatively include adjusting supplementary data based on vehicle speed in any suitable manner (e.g., speed-adjusted barometer measurements due to air motion relative to a moving vehicle).

As shown in previous examples, supplementary data collection may experience a high degree of variability based on collection mechanisms used. S140 preferably includes associating GPS data and supplementary data in a manner adjusted to account for some of this variability.

For example, if accelerometer data is collected by a smartphone, the data may vary significantly based on position and orientation of the smartphone within the vehicle. S140 may include automatically adjusting collected data to account for this; additionally or alternatively, S140 may include requesting that a user position the smartphone in a particular manner.

Likewise, supplementary data collected by a mobile navigation system may vary based on the driver and/or the vehicle the mobile navigation system is associated with. S140 may include modifying supplementary data based on vehicle and/or driver; for example, if S140 includes associating road surface measurement (as detected by accelerometer) with position, the suspension response of the vehicle may need to be taken into account to allow data taken in one vehicle to be compared to another.

S140 may include identifying a vehicle and/or driver of the vehicle by asking the navigation system user to identify the vehicle and/or driver. Additionally or alternatively, S140 may include identifying a vehicle and/or driver automatically.

Figure 7:
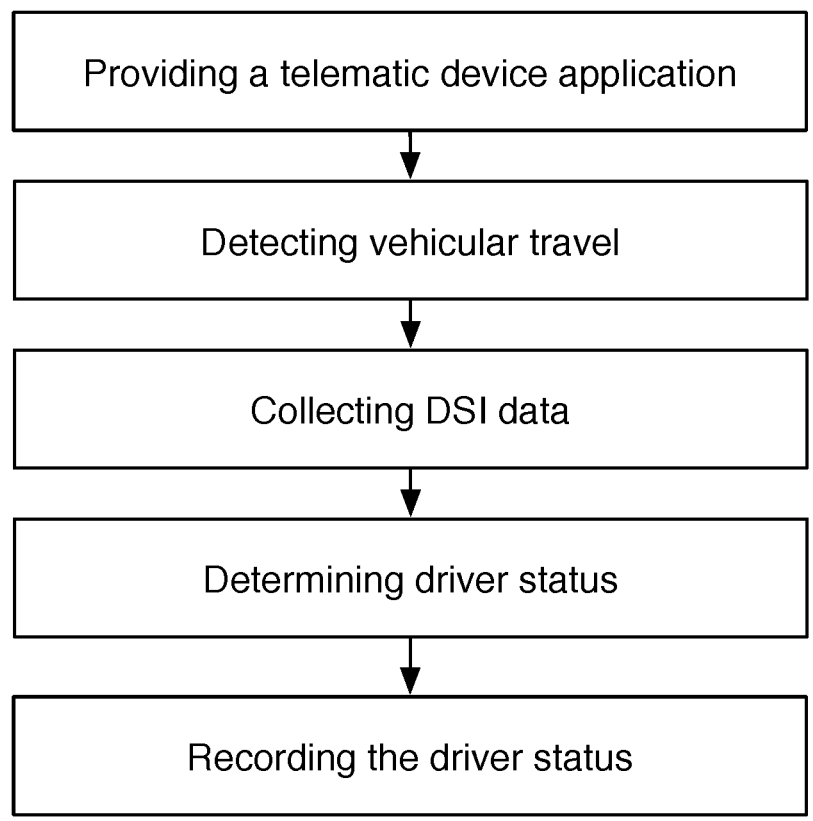
FIG. 7 is a flowchart representation of automatic driver identification of a method of a preferred embodiment.

In one implementation of a preferred embodiment, S140 includes identifying a vehicle and/or driver automatically as shown in FIG. 7, and as described in U.S. patent application Ser. No. 14/206,721, the entirety of which is incorporated by this reference.

S150 includes performing navigation based on the supplementary data. S150 functions to perform vehicle navigation according to supplementary data, but may perform navigation based solely on supplementary data or based on a combination of both supplementary data and GPS data (and/or any other relevant data). S150 preferably includes performing navigation by comparing position (e.g., latitude and longitude, relative position compared to roads, etc.) as computed from supplementary data to map data, but may additionally or alternatively include performing navigation in any manner.

S150 preferably includes performing navigation (e.g., providing a user with directions, providing directions to a self-driving car, etc.) according to the navigation system state, as previously described. The navigation system state preferably determines how supplementary data and GPS data are used to perform navigation, as well as supplementary data and GPS data collection parameters. The navigation state may also determine how supplementary data and GPS data are processed and/or calibrated or for any other suitable purpose.

In one variation of a preferred embodiment, S150 includes suggesting road lanes for a vehicle to occupy. For example, if S140 enables the identification of the lane a vehicle is traveling in, S150 may include directing vehicles to occupy a particular lane (e.g., occupy the right-hand lane to make a particular turn).

The system and methods of the preferred embodiment and variations thereof can be embodied and/or implemented at least in part as a machine configured to receive a computer-readable medium storing computer-readable instructions.

The instructions are preferably executed by computer-executable components preferably integrated with a navigation system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for primarily sensor-based navigation of a vehicle on a road surface, the method comprising:
   in a first time period, collecting geophysical position data using a GPS receiver of a navigation device;
   in the first time period, collecting a first set of supplementary data using a supplementary sensor of the navigation device;
   determining a first set of vertical vehicular motion data based on the first set of supplementary data;
   generating a mapping association between the first set of vertical vehicular motion data and the geophysical position data;
   in a second time period after the first time period, collecting a second set of supplementary data using the supplementary sensor;
   determining a second set of vertical vehicular motion data based on the second set of supplementary data; and
   determining an estimated location of the vehicle based on the second set of vertical vehicular motion data and the mapping association.

2. The method of claim 1, wherein the supplementary sensor comprises an inertial measurement unit (IMU), wherein the first and second sets of supplementary data are collected by the IMU.

3. The method of claim 1, wherein vertical vehicular motion data describes motion of the vehicle perpendicular the road surface.

4. The method of claim 1, further comprising:
   determining a set of previously traveled routes, each previously traveled route of the set of previously traveled routes associated with geophysical positions previously mapped to vertical vehicular motion data;
   receiving, at the navigation device, a travel source and a travel destination;
   determining that a first previously traveled route from the set of previously traveled routes intersects the travel source, the travel destination, and the estimated location of the vehicle; and
   navigating the vehicle according to the first previously traveled route.

5. The method of claim 4, further comprising, in response to identifying the first previously traveled route, switching off the GPS receiver; wherein navigating the vehicle according to the first previously traveled route comprises navigating based on vertical vehicular motion data without collecting additional GPS data.

6. The method of claim 1, wherein determining the estimated location of the vehicle comprises:
   inferring a GPS-measured initial vehicular location from a second set of geophysical position data collected by the GPS receiver; wherein the geophysical position data is collected at a first time between the first time period and the second time period;
   generating a set of potential locations, each potential location of the set of potential locations associated with a vertical vehicular motion profile; and
   calculating the estimated location of the vehicle from the set of potential locations based on: proximities of the set of potential locations to the GPS-measured initial vehicular location and correlations of the vertical vehicular motion profiles to the second set of vertical vehicular motion data.

7. The method of claim 1, wherein determining the estimated location of the vehicle comprises:
   inferring a GPS-measured initial vehicular location from a second set of geophysical position data collected by the GPS receiver; wherein the geophysical position data is collected at a first time between the first time period and the second time period;
   collecting a third set of supplementary data between the first time and a second time in the second time period;
   analyzing the third set of supplementary data to produce a first set of horizontal vehicular motion data;
   calculating a vehicle position change from the first set of horizontal vehicular motion data;
   calculating a GPS-and-supplemental-sensor-derived location by adding the vehicle position change to the GPS-measured initial vehicular location;
   generating a set of potential locations, each potential location of the set of potential locations associated with a vertical vehicular motion profile; and
   calculating the estimated location of the vehicle from the set of potential locations based on both of proximities of the set of potential locations to the GPS-and-supplemental-sensor-derived location and correlations of the vertical vehicular motion profiles to the second set of vertical vehicular motion data.

8. The method of claim 1, further comprising:
   in the first time period, collecting a first vehicle speed;
   in the second time period, collecting a second vehicle speed;
   wherein determining the estimated location of the vehicle comprises time-scaling the second set of vertical vehicular motion data based on a difference between the first vehicle speed and the second vehicle speed.

9. The method of claim 1, further comprising:
   in the first time period, collecting a first vehicle suspension profile;
   in the second time period, collecting a second vehicle suspension profile;
   wherein determining the estimated location of the vehicle comprises analyzing the second set of vertical vehicular motion data based on: the mapping association, the first vehicle suspension profile, and the second vehicle suspension profile.

10. The method of claim 1, wherein the second set of vertical vehicular motion data describes motion of the vehicle perpendicular a road surface supporting the vehicle.

11. The method of claim 1, further comprising, before collecting the set of accelerometer data:
   in a time period, collecting the set of geophysical position data using a GPS receiver of a navigation device;
   in the time period, collecting a second set of accelerometer data using an accelerometer of the navigation device;
   analyzing the second set of accelerometer data to produce the first set of vertical vehicular motion data; and generating the mapping association based on the first set of vertical vehicular motion data and the set of geophysical position data.

12. A method for navigation of a vehicle, the method comprising:
receiving a mapping association between a first set of vertical vehicular motion data and a set of geophysical position data;
after receiving the mapping association, collecting a set of accelerometer data;
analyzing the set of accelerometer data to produce a second set of vertical vehicular motion data; and
determining an estimated location of the vehicle based on the second set of vertical vehicular motion data and the mapping association.

13. The method of claim 12, further comprising determining a set of vehicle suspension calibration data, wherein determining the estimated location comprises analyzing the second set of vertical vehicular motion data in light of: the mapping association and the set of vehicle suspension calibration data.

14. The method of claim 13, wherein the set of accelerometer data is collected during a time period, wherein determining the set of vehicle suspension calibration data comprises:
collecting a set of geophysical position data, the set of geophysical position data received by a GPS receiver during the time period;
deriving a GPS-derived location based on the set of geophysical position data;
generating a reference vertical vehicular motion profile from the mapping association and the GPS-derived location;
determining a comparison between the reference vertical vehicular motion profile and the second set of accelerometer data; and
generating the set of vehicle suspension calibration data based on the comparison.

15. The method of claim 13, wherein the set of accelerometer data is collected at an accelerometer of a navigation device, the method further comprising, at the navigation device, detecting a vehicle type of the vehicle, wherein the set of vehicle suspension calibration data is determined based on the vehicle type.

16. The method of claim 12, further comprising:
determining a set of previously traveled routes, each previously traveled route of the set of previously traveled routes associated with geophysical positions previously mapped to vertical vehicular motion data;
receiving a travel source and a travel destination;
determining that a first previously traveled route from the set of previously traveled routes intersects the travel source, the travel destination, and the estimated location of the vehicle; and
navigating the vehicle according to the first previously traveled route.

17. The method of claim 12, wherein the set of accelerometer data is collected at an accelerometer of a navigation device, the method further comprising:
determining a location estimate error; and
in response to the location estimate error falling below a location estimate error threshold, disabling a GPS receiver of the navigation device and navigating based on vertical vehicular motion data without collecting additional GPS data.

18. The method of claim 17, wherein the set of accelerometer data is collected during a time period, wherein determining the location estimate error comprises:
collecting a set of geophysical position data, the set of geophysical position data received by the GPS receiver during the time period;
determining a GPS-derived location based on the set of geophysical position data;
determining a comparison between the GPS-derived location and the estimated location of the vehicle; and
calculating the location estimate error based on the comparison.

19. The method of claim 12, wherein calculating an estimated location of the vehicle comprises:
inferring a GPS-measured initial vehicular location from a second set of geophysical position data collected by the GPS receiver; wherein the geophysical position data is collected at a first time between the first time period and the second time period;
collecting a third set of accelerometer data between the first time and a second time in the second time period;
analyzing the third set of accelerometer data to produce a first set of horizontal vehicular motion data;
calculating a vehicle position change from the first set of horizontal vehicular motion data;
calculating a GPS-and-accelerometer-derived location by adding the vehicle position change to the GPS-measured initial vehicular location;
calculating a vertical-accelerometer-derived location and a vertical-accelerometer confidence by analyzing the second set of vertical vehicular motion data in light of the mapping association; and
selecting one of the GPS-and-accelerometer-derived location and the vertical-accelerometer-derived location as the estimated location of the vehicle based on the vertical-accelerometer-derived confidence.

20. The method of claim 12, wherein the set of accelerometer data is collected during a time period at an accelerometer of a navigation device, the method further comprising:
collecting a second set of geophysical position data using a GPS receiver of the navigation device during the time period;
deriving a GPS-derived location based on the second set of GPS geophysical position data;
calculating a GPS accuracy confidence in the GPS-derived location; wherein:
calculating an estimated location of the vehicle comprises calculating an estimated location of the vehicle from a weighted combination of an initial estimated location and the GPS-derived location;
the initial estimated location is calculated from analysis of the second set of vertical vehicular data alone; and
the GPS-derived location is weighted by the GPS accuracy confidence.

21. The method of claim 20, further comprising modifying a duty cycle of the GPS receiver based on the GPS accuracy confidence.

22. The method of claim 20, wherein calculating a GPS accuracy confidence comprises computing a geometric dilution of precision rating and comparing the geometric dilution of precision rating to a geometric dilution of precision rating threshold.

* * * * *